(12) United States Patent
Romo (10) Patent No.: US 7,624,642 B2
(45) Date of Patent: Dec. 1, 2009

(54) DIFFERENTIAL PRESSURE SENSOR ISOLATION IN A PROCESS FLUID PRESSURE TRANSMITTER

(75) Inventor: Mark G. Romo, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/903,068

(22) Filed: Sep. 20, 2007

(65) Prior Publication Data

US 2009/0078054 A1    Mar. 26, 2009

(51) Int. Cl.
*G01L 9/00* (2006.01)
(52) U.S. Cl. .............................. 73/717; 73/715; 73/716; 73/753
(58) Field of Classification Search ........... 73/700–756; 361/283.1–283.4
See application file for complete search history.

(56) References Cited

U.S. PATENT DOCUMENTS

| | | | |
|---|---|---|---|
| 3,793,885 A | 2/1974 | Frick ............................ | 73/398 |
| 3,800,413 A | 4/1974 | Frick ............................ | 29/592 |
| 4,072,058 A * | 2/1978 | Whitehead, Jr. ............... | 73/720 |
| 4,120,206 A | 10/1978 | Rud, Jr. ......................... | 73/718 |
| 4,163,395 A * | 8/1979 | Medlar et al. .................. | 73/708 |
| 4,218,925 A * | 8/1980 | DiDomizio, Jr. .............. | 73/706 |
| 4,285,244 A * | 8/1981 | Green ........................... | 73/720 |
| 4,370,890 A | 2/1983 | Frick ............................ | 73/718 |
| 4,572,000 A | 2/1986 | Kooiman ...................... | 73/718 |
| 4,586,108 A | 4/1986 | Frick .......................... | 361/283 |
| 4,603,371 A | 7/1986 | Frick .......................... | 361/283 |
| 4,612,812 A | 9/1986 | Broden ......................... | 73/718 |
| 4,730,496 A | 3/1988 | Knecht et al. .................. | 73/724 |
| 4,745,810 A | 5/1988 | Pierce et al. ................... | 73/706 |
| 4,790,192 A | 12/1988 | Knecht et al. ................. | 73/721 |
| 4,833,920 A | 5/1989 | Knecht et al. ................. | 73/717 |
| 4,841,776 A | 6/1989 | Kawachi et al. | |
| 4,944,187 A | 7/1990 | Frick et al. ..................... | 73/718 |
| 5,483,834 A | 1/1996 | Frick ........................... | 73/724 |

(Continued)

OTHER PUBLICATIONS

S. Hein et al., "Capacitive Differential Pressure Sensor With High Overload Capability Using Silicon/Glass Technology," Transducers '97, 1997 International Conference on Solid-State Sensors and Actuators, p. 1477-1480.

(Continued)

*Primary Examiner*—Lisa M Caputo
*Assistant Examiner*—Jermaine Jenkins
(74) *Attorney, Agent, or Firm*—Christopher R. Christenson; Westman, Champlin & Kelly, P.A.

(57) ABSTRACT

A differential pressure transmitter includes first and second process fluid inlets. A differential pressure sensor is disposed within the transmitter and has first and second sensor inlets. A first isolator diaphragm is located proximate the first process fluid inlet and is operably coupled to the first sensor inlet through a first fill fluid volume. A second isolator diaphragm is located proximate the second process fluid inlet and is operably coupled to the second sensor inlet through a second fill fluid volume. Measurement circuitry is operably coupled to the differential pressure sensor and configured to measure an electrical parameter of the sensor and provide an indication of the measured parameter. A third fluid volume substantially surrounds the differential pressure sensor. The third fluid volume exerts a compressive force on the differential pressure sensor.

10 Claims, 7 Drawing Sheets

U.S. PATENT DOCUMENTS

| | | | | |
|---|---|---|---|---|
| 5,520,054 | A | 5/1996 | Romo | 73/715 |
| 5,546,804 | A | 8/1996 | Johnson et al. | 73/431 |
| 5,684,253 | A | 11/1997 | Bonne et al. | |
| 5,731,522 | A | 3/1998 | Sittler | 73/708 |
| 6,003,219 | A | 12/1999 | Frick et al. | 29/25.41 |
| 6,041,659 | A * | 3/2000 | Wilda et al. | 73/720 |
| 6,295,875 | B1 | 10/2001 | Frick et al. | 73/718 |
| 6,487,912 | B1 | 12/2002 | Behm et al. | 73/753 |
| 6,581,469 | B2 * | 6/2003 | Burczyk et al. | 73/716 |
| 6,662,662 | B1 | 12/2003 | Nord et al. | 73/715 |
| 6,883,380 | B2 * | 4/2005 | Romo | 73/729.2 |
| 6,920,795 | B2 * | 7/2005 | Bischoff et al. | 73/706 |
| 7,080,558 | B2 * | 7/2006 | Broden et al. | 73/706 |
| 7,190,053 | B2 | 3/2007 | Orth et al. | 257/659 |
| 7,287,432 | B2 | 10/2007 | Schnaare et al. | 73/706 |
| 2002/0108447 | A1 | 8/2002 | Burczyk et al. | |
| 2004/0226383 | A1 | 11/2004 | Romo | 73/729.2 |
| 2005/0072243 | A1 | 4/2005 | Broden et al. | |

OTHER PUBLICATIONS

Search Report and Written Opinion for application no. PCT/US2008/075194, mailed Nov. 26, 2008.

* cited by examiner

DIFFERENTIAL PRESSURE SENSOR ISOLATION IN A PROCESS FLUID PRESSURE TRANSMITTER

BACKGROUND

A process transmitter generally includes a transducer or sensor that responds to a process variable. A process variable generally refers to a physical or chemical state of matter or conversion of energy. Examples of process variables include pressure, temperature, flow, conductivity, pH and other properties. Pressure is considered to be a basic process variable in that it can be used to measure flow, level and even temperature.

Pressure transmitters are commonly used in industrial processes to measure and monitor pressures of various industrial process fluids, such as slurries, liquids, vapors and gases of chemical, pulp, petroleum, gas, pharmaceuticals, food and other fluid-type processing plants. Differential pressure transmitters generally include a pair of process pressure fluid inputs which are operably coupled to a differential pressure sensor (within the transmitter) that responds to the difference in pressure between the two inputs. Differential pressure transmitters typically include a differential pressure sensor operably coupled to a pair of isolator diaphragms. The isolator diaphragms are positioned at the process fluid inlets and isolate the differential pressure sensor from the harsh process fluids being sensed. Pressure is transferred from the process fluid to the differential pressure sensor through a substantially incompressible fill fluid carried in a passageway extending from the isolator diaphragm to the differential pressure sensor.

Differential pressure sensors generally include a movable diaphragm that has a first side coupled to a first pressure, and a second side coupled to a second pressure. The difference between the pressures generates a net displacement on the movable diaphragm. The diaphragm has an electrical characteristic, such as capacitance or resistance that varies with the displacement. The electrical characteristic can then be monitored, or otherwise measured, as an indicator of the differential pressure. Differential pressure sensors are useful in many applications. However, they are often found in applications where process fluid flow is measured. In these applications, a differential pressure producer is disposed within a process fluid conduit, such as a pipe, and fluid flow through the producer generates a differential pressure. The differential pressure generated across the producer is then mathematically related to process fluid flow through the conduit.

While the differential pressure itself may be of any magnitude, depending on the process fluid flow, viscosity, density, et cetera, the actual line pressure of the process fluid within the conduit can vary independently of the differential pressure. For example, a process fluid of relatively low density, flowing through a slight obstruction may only generate a slight differential pressure. However, the overall pressure within the flow conduit may be extremely large. Accordingly, differential pressure sensing systems are generally specified the maximum differential pressure that can be transduced, as well as the maximum line pressure to which the system can be exposed. Such systems are generally designed to accommodate at least some pressure excursions beyond maximum stated line pressures. These excursions are known as overpressure events. The manner in which such differential pressure systems respond to and recover from such overpressure events is extremely important. For example, if the overpressure event ruptures, or otherwise deteriorates process fluid couplings within the sensing system, the ability of the sensing system to continue to operate is destroyed. Additionally, if plastic deformations occur within the differential pressure sensing system, a systemic error may be introduced from that point forward, which error will affect all subsequent differential pressure measurements.

An overpressure event for such a system may cause the movable diaphragm of the sensor to fully engage a wall of the sensing chamber. In such situations, the interior of the differential pressure sensor itself is fully subject to the line pressure during the overpressure event. While this is clearly undesirable, it is even more undesirable for semiconductor-based pressure sensors. These semiconductor-based differential pressure sensors typically employ brittle materials, such as semiconductor materials, and are built from a stack up of layers of semiconductor material. They are typically bonded together to form the overall sensor, but it is known that such sensors are not able to withstand significant tensile forces on the layer interfaces.

A process fluid differential pressure transmitter with better responses to overpressure situations would advance the art of sensing differential pressure process fluid. Additionally, such a transmitter may allow for operation in more demanding application, and/or provide longer operating lifetimes.

SUMMARY

A differential pressure transmitter includes first and second process fluid inlets. A differential pressure sensor is disposed within the transmitter and has first and second sensor inlets. A first isolator diaphragm is located proximate the first process fluid inlet and is operably coupled to the first sensor inlet through a first fill fluid volume. A second isolator diaphragm is located proximate the second process fluid inlet and is operably coupled to the second sensor inlet through a second fill fluid volume. Measurement circuitry is operably coupled to the differential pressure sensor and configured to measure an electrical parameter of the sensor and provide an indication of the measured parameter. A third fluid volume substantially surrounds the differential pressure sensor. The third fluid volume exerts a compressive force on the differential pressure sensor.

DETAILED DESCRIPTION

At least some aspects of embodiments of the present invention stem from a unique understanding of deficiencies in prior art differential pressure sensing systems in the way that such systems respond to and recover from overpressure events. Differential pressure transmitters using semiconductor-based differential pressure sensor, such as those employing high-performance MicroElectroMechanical Systems (MEMS) differential pressure sensors are limited in their final performance specifications by the oil isolation techniques used to eliminate the full line pressure containment and overpressure requirements on such sensors. This requirement generally involves significant oil volumes to immerse the sensor and to allow the isolator diaphragms to work. The isolator diaphragms themselves have temperature and pressure hysteresis and non-repeatability. These errors are always present in addition to the errors of the pressure sensor itself. To avoid immersing the differential pressure sensor in oil, attempts to reinforce the differential pressure sensor itself include the use of clamping hardware. However, such clamping hardware generally results in errors. The clamping hardware produces pressure and temperature hysteresis in the sensor. Further, the amount of errors from a sensing mechanism generally scales directly with the amount of physical contact with the sensing mechanism.

As will be set forth in greater detail below, various embodiments of the present invention generally encapsulate the differential pressure sensor within an independent volume of fill fluid. The various embodiments disclosed provide different solutions to addressing overpressure events, as well as measurement and compensation for variations in line pressure and/or operating temperature.

Figure 1:
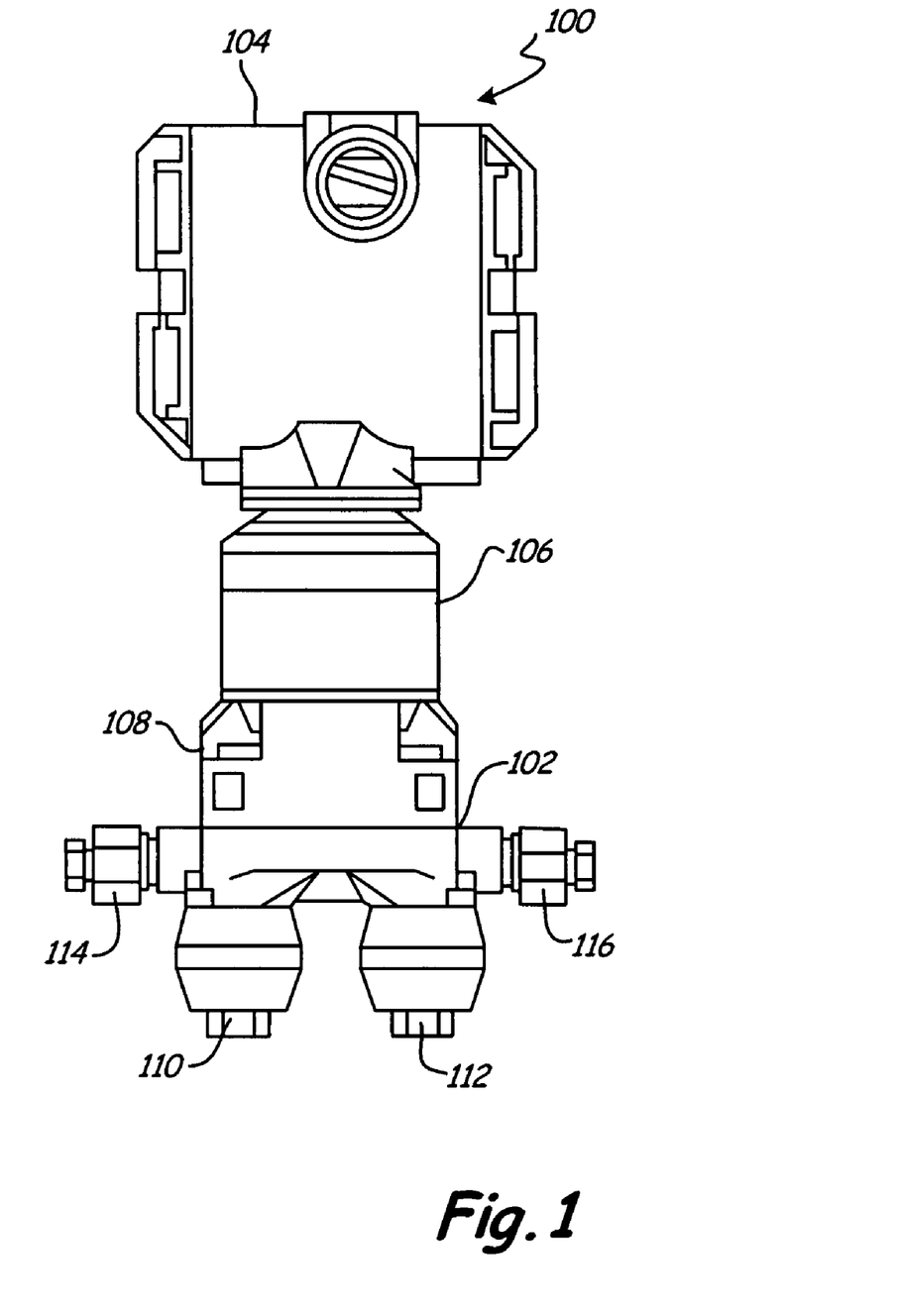
FIG. 1 is a diagrammatic view of an exemplary pressure transmitter coupled to a flange.

FIG. 1 illustrates an exemplary pressure transmitter 100 with which disclosed embodiments are useful. Pressure transmitter 100 generally includes a transmitter body 104 coupled to a sensor body 106, where sensor body 106 is further coupled to an isolator assembly 108 that is finally coupled to a flange or manifold 102. Alternatively, transmitter body 104 and sensor body 106 can be formed as an integral instrument. In FIG. 1, flange 102 is a CoPlanar™ type product. CoPlanar™ type products includes flange 102 that taps into the process fluid for access versus the flange being in-line with the process fluid. Such flanges are available from Rosemount, Inc. of Chanhassen, Minn. under the trade designation Model 305 and 306 manifolds. However, embodiments can be used with other types of flanges or manifolds that use other types of couplings to receive process fluid.

Flange 102 includes a pair of process fluid inlets 110 and 112 and a pair of vent assemblies 114 and 116. Process fluid inlets 110 and 112 allow pressure transmitter 100 to measure differential (or gage) pressure of the process fluid.

Figure 2:
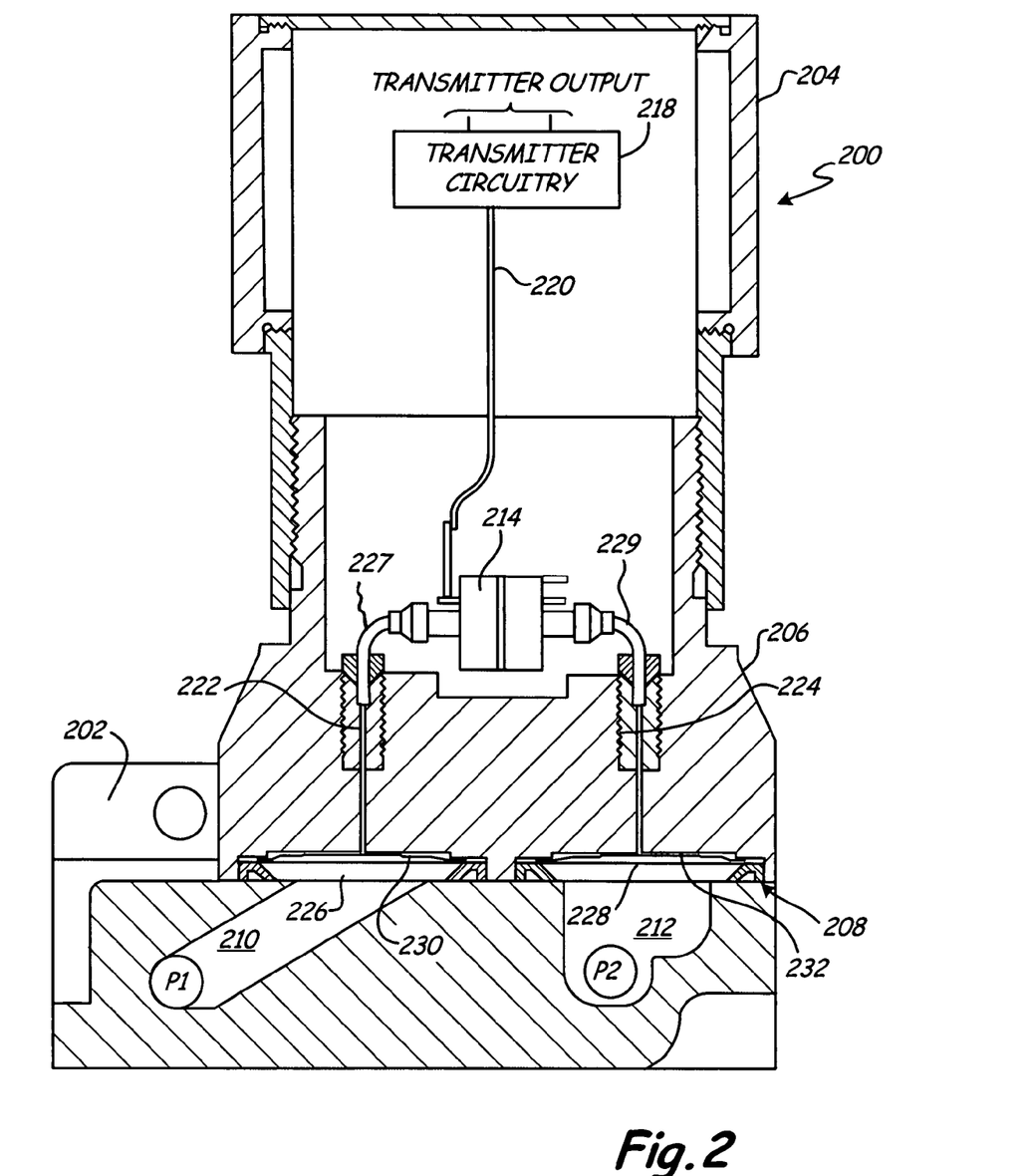
FIG. 2 is a sectional view of differential pressure transmitter environment in which embodiments of the present invention are useful.

FIG. 2 illustrates a sectional view of a pressure transmitter 200 coupled to a flange or manifold 202. Pressure transmitter 200 includes a transmitter body 204 and a sensor body 206. Transmitter body 204 and sensor body 206 can be made of the same material. Typically, sensor body 206 is formed of a castable alloy such as 316 or 316L stainless steel. Transmitter body 204 can be formed of aluminum or stainless steel. Sensor body 206 is configured to house a differential pressure sensor 214 and an isolator assembly 208. Transmitter body 204 is configured to house transmitter circuitry 218. Sensor 214 is coupled to transmitter circuitry 218 via leads 220.

Transmitter circuitry 218 sends information related to the pressure of the process fluid over a communication link such as the transmitter output illustrated in FIG. 2. For example, transmitter circuitry 218 can send information related to differential pressure of a process fluid over a two wire communication circuit, such as a 4-20 mA current loop or process control industry standard HART® or Fieldbus loop. Pressure transmitter 200 can be powered by a controller through its connection over the communication circuit. Alternatively, or additionally, transmitter 200 can use a wireless network.

Pressure sensor 214 generally measures a difference in pressure between pressure P1 in a first inlet 210 of flange 202 and pressure P2 in a second inlet 212 of flange 202. Pressure P1 is coupled to pressure sensor 214 through a first passageway 222. Pressure P2 is coupled to pressure sensor 214 through a second passageway 224. First passageway 222 extends from a first opening 226 in pressure transmitter 200 to pressure sensor 214 and through first sensor mounting tube 227. Second passageway 224 extends from a second opening 228 in pressure transmitter 200 to pressure sensor 214 and through second sensor mounting tube 229. Passageways 222 and 224 are filled with a relatively incompressible fill fluid, such as oil, silicone oil, glycerin and water, propylene glycol and water or any other suitable fluid.

Isolator assembly 208 includes a first isolator diaphragm 230 positioned in first opening 226 and coupled to sensor body 206. Isolator assembly 208 also includes a second isolator diaphragm 232 positioned in second opening 228 and coupled to sensor body 206. First isolator diaphragm 230 is in communication with the fill fluid in first passageway 222 while simultaneously in communication with the process fluid in inlet 210. Second isolator diaphragm 232 is in communication with the fill fluid in second passageway 224 while simultaneously in communication with the process fluid in inlet 212. Isolator diaphragms 230 and 232 transfer properties and characteristics of the process fluid at inlets 210 and 212 to the fill fluid in passageways 222 and 224. Pressure sensor 214 senses properties and characteristics of the fill fluid contained in passageways 222 and 224. When pressure transmitter 200 is exposed to a process fluid and/or ambient temperature that has varying environmental conditions, such as extreme temperature fluctuations, the fill fluid expands as temperature increases.

Figure 3:
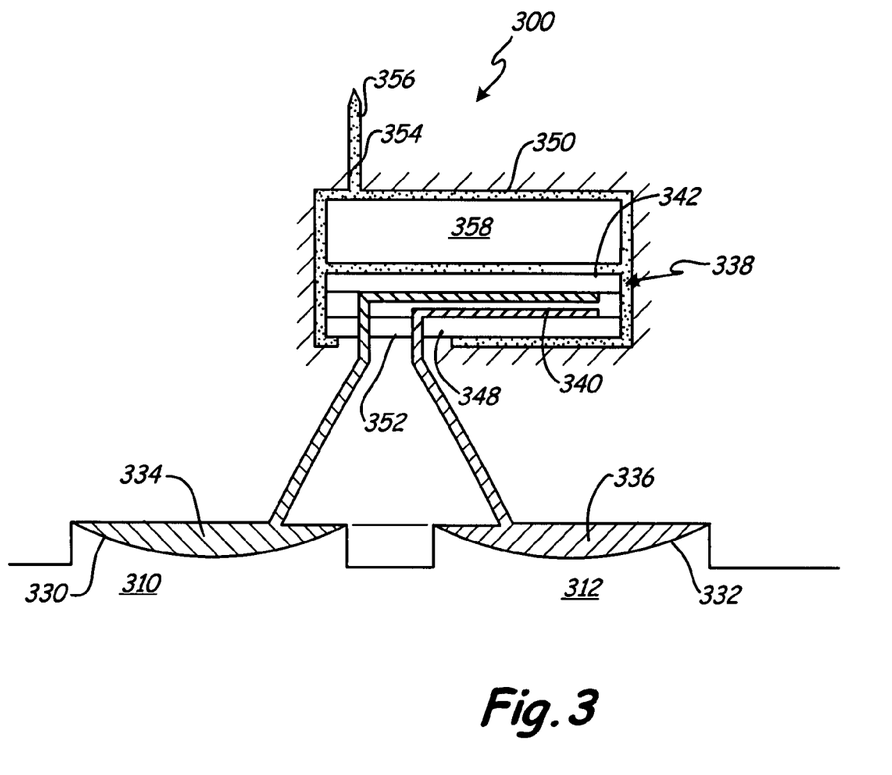
FIG. 3 is a cross sectional view of a portion of a differential pressure transmitter in accordance with an embodiment of the present invention.

FIG. 3 is a cross sectional view of a portion of a differential pressure transmitter in accordance with an embodiment of the present invention. Transmitter 300 includes a pair of process fluid pressure inlets 310 and 312 which are coupled, respectively, to individual sources of process fluid pressure. Each process fluid pressure inlet 310, 312 includes an isolator diaphragm 330, 332, respectively. The isolator diaphragms deflect in response to pressure in the process fluid pressure inlets, and the deflection transfers such pressure through isolation fluids 334 and 336. Isolation fluid 334 conveys pressure from isolator diaphragm 330 to a first side of a sensing diaphragm of differential pressure sensor 338. Similarly, isolation fluid 336 conveys pressure from isolation diaphragm 332 to a second side of sensing diaphragm 340 of differential pressure sensor 338. Isolation fluid 334 can be considered a first volume of isolation fluid, and isolation fluid 336 can be considered a second volume. The first and second volumes of isolation fluid are fluidically separate from one another. As can be appreciated, as line pressure increases, the pressure within first volume 334 and second volume 336 operate to urge first layer 342 and second layer 348 of differential pressure sensor 338 apart. This would normally place the various layers of differential pressure sensor 338 in tension, which is undesirable, especially for brittle material-based pressure sensors. However, as can be seen in FIG. 3, differential pressure sensor 338 is disposed within sealed chamber 350 and is mounted upon pedestal 352. In accordance with an embodiment of the present invention, chamber 350 is pressurized. Preferably, the pressurization of chamber 350 is done to a level that substantially equals the maximum expected line pressure to which the differential pressure sensor 338 will be exposed. Additionally, it is preferred that the pressurization of chamber 350 be done using an incompressible fill fluid, such as the same type of fill fluid used for volumes 334 and 336. Accordingly, a third fluid volume 354 exists within chamber 350 and has a pressure that is specified based upon the anticipated operating conditions of differential pressure sensor 338. Once the pressurization has reached the correct level, a conduit such as conduit 356 is sealed to maintain the relatively high pressure therein.

As the temperature of the differential pressure sensor and/or the differential pressure transmitter changes, the various materials therein may undergo relative expansions or contractions. These changes can be particularly troublesome when even a slight displacement upon sensing diaphragm 340 will indicate a change in pressure. Accordingly, it is preferred that temperature compensation body 358 be disposed within chamber 350 and within third fluid volume 354. Compensation body 358 preferably constructed from a suitable material with a specific thermal expansion coefficient. The chosen thermal expansion coefficient for the material of body 358 is such that the sum of the changes in volume of the material of body 358 and sealed oil 354, with temperature, equals the change in volume of chamber 350 minus the change in volume of differential pressure sensor 338. This provides a relatively constant pressure for third volume 354 as temperature changes to the practical limit of the expansion coefficient tolerances. Temperature compensation of the differential pressure transmitter preferably includes compensating for errors associated with third volume 354. Additionally, a pressure indication of third volume 354 could also be used as a diagnostic and could be measured, or otherwise transduced, by differential pressure sensor 338. For example, the compressive forces of fluid 354 will force first layer 342 and second layer 348 towards one another. Such force may cause a displacement of the top layer toward the bottom layer, which displacement may be measured by the capacitance measurements from the sensing diaphragm 340 to first layer 342 and capacitance measurements from the sensing diaphragm 340 to second layer 348. The example given above uses capacitance based sensing, but any sensing regime that is responsive to displacement between a sensing diaphragm and the first and second layers 342, 348 can be used. Additionally, it is expressly contemplated that yet another pressure sensor could be fluidically coupled to third volume 354 to measure the pressure directly.

Since third volume 354 is pressurized to the maximum foreseeable operating line pressure of the transmitter, it is noted that the various joints and bonds within differential pressure sensor 338 are maintained in compression during the entire operating lifetime of sensor 338 unless and until the line pressure significantly exceeds the pressure maintained within third volume 354.

The embodiment illustrated in FIG. 3 allows for the stroke of the isolator diaphragms to be limited to only the amount needed for the differential pressure sensing diaphragm 340, the thermal expansion of the oil, and the bulk compression of the oil with line pressure. If one or more additional compensating bodies are included within volumes 334, 336, the stroke is limited even more. It is believed that by reducing the stroke required for the isolation diaphragms, the differential pressure sensor's response time will decrease. Additionally, there is the potential to shrink the isolator diaphragms. Finally, the fluid of the third volume 354 can potentially be selected independently from that for volumes 334 and 336 to optimize a specific parameter like best thermal expansion performance.

Figure 4:
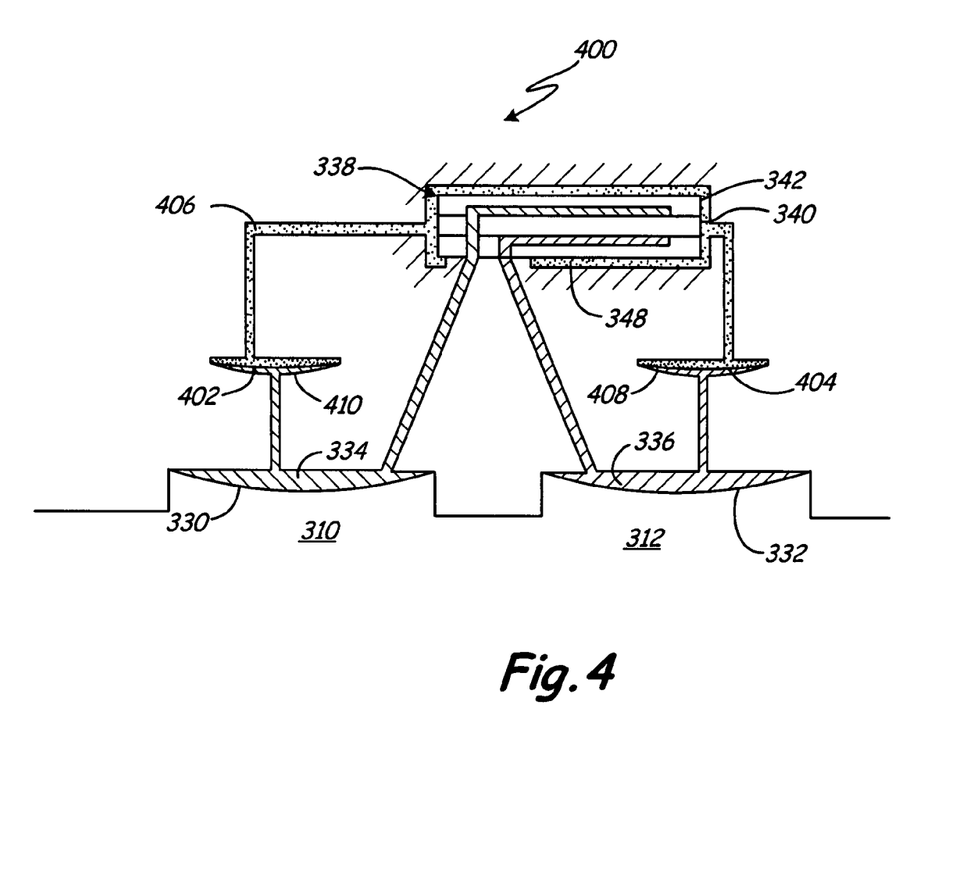
FIG. 4 is a cross sectional view of a portion of a differential pressure transmitter in accordance with another embodiment of the present invention.

FIG. 4 is a cross sectional view of a portion of a differential pressure transmitter in accordance with another embodiment of the present invention. Transmitter 400 bears some similarities to transmitter 300, and like components are numbered similarly. Differential pressure transmitter 400 includes first and second process fluid pressure inlets 310, 312 and respective isolator diaphragms 330, 332. Pressure at port 310, through isolator diaphragm 330, bears upon first side of sensing diaphragm 340 via first isolator fluid volume 334. Similarly, pressure at port 312 bears upon a second surface of sensor diaphragm 340 via isolator diaphragm 332 and second isolator fluid volume 336. The embodiment illustrated with respect to FIG. 4 differs from that of FIG. 3 in that each of isolation fluid volumes 334 and 336 are coupled to respective secondary isolator diaphragms 402, 404. The third volume of fluid 406 surrounds differential pressure sensor 338, but is pressurized to the maximum of pressures experienced on isolator diaphragms 330, 332. Secondary isolators 402, 404, are the only isolators that bottom out during an overpressure condition. For example, secondary isolator 404 will bottom out when the pressure at inlet 310 is at a high pressure, and the pressure at inlet 312 is vented. In this condition, secondary isolator 402 will not be bottomed out, and pressure experienced at inlet port 310 is still transmitted into oil volume 334 and is also transmitted into oil volume 406 which, in turn, drives secondary isolator 404 into secondary isolator stop 408. In the reverse condition, secondary isolator 402 is bottomed out against secondary isolator stop 410 when the pressure at inlet port 312 is at a high pressure and pressure at inlet port 310 is vented. Again, in this condition, secondary isolator 404 is not bottomed out, and the pressure at inlet port 312 is still transmitted into oil volume 336 and is also transmitted into oil volume 406, thereby driving the secondary isolator 402 into secondary isolator stop 410. Accordingly, in all cases, the exterior of differential pressure sensor 338 is maintained under the line pressure, or the highest pressure of either of pressure inlets 310, 312. In this manner, the line pressure is plumbed, or otherwise fluidically coupled to oil volume 406.

Secondary isolators 402, 404 need only be separated from their respective stop surfaces 410, 408, during operating conditions. All the oil stroke that is needed in the system is to drive secondary isolators 402, 404 to the respective stops 410, 408. Since secondary isolators 402, 404 will always only be bottomed out in only one direction, there will be minimal effects on output from an overpressure event due to isolator effects. In the case of a brittle material based differential pressure sensor, after an overpressure excursion, there are little effects on output due to overpressure events in either direction.

Figure 5:
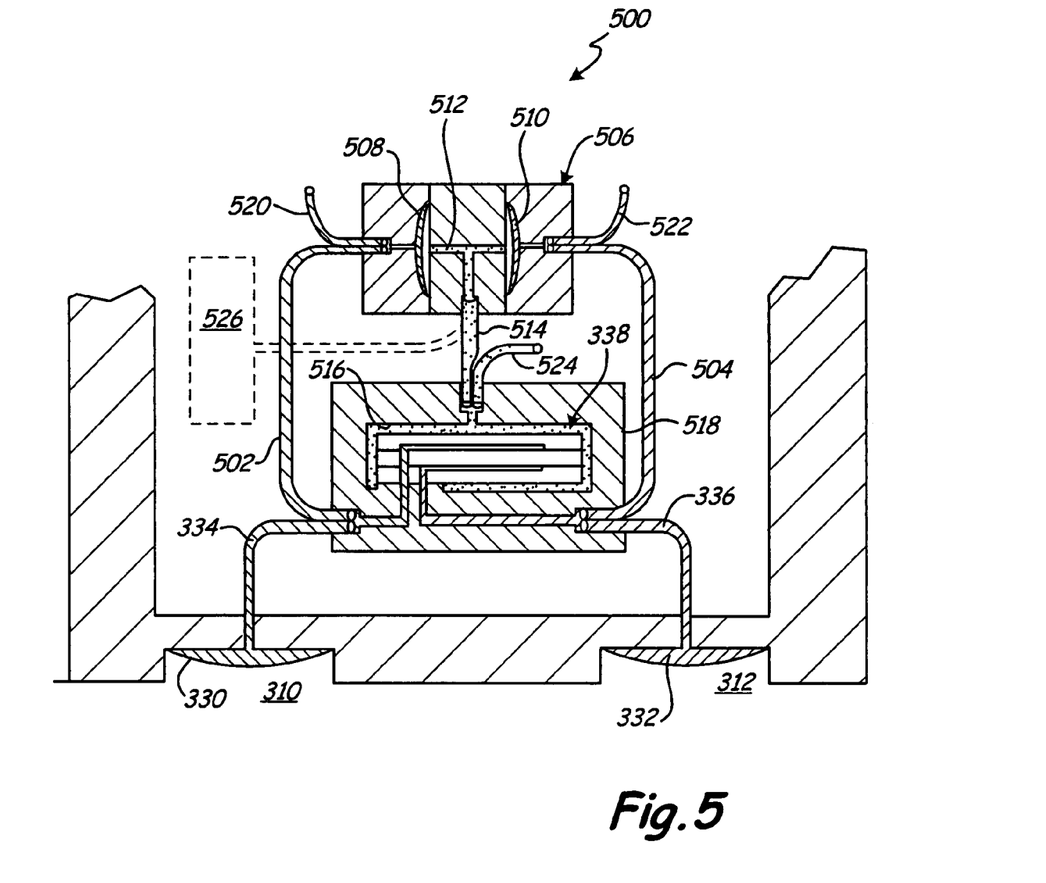
FIG. 5 is a cross sectional view of a portion of a differential pressure transmitter in accordance with another embodiment of the present invention.

FIG. 5 is a cross sectional view of a portion of a differential pressure transmitter in accordance with an embodiment of the present invention. The embodiment illustrated with respect to FIG. 5 shares some components with previous embodiments, and like components are numbered similarly. The embodiment illustrated with respect to FIG. 5 provides first isolator fluid volume 334 coupled to isolator diaphragm 330, and to a first pressure inlet of differential pressure sensor 338. Similarly, a second oil volume 336 is coupled to isolator diaphragm 332 and the opposite, or second, side of differential pressure sensor 338. Each of first and second volumes 334 and 336 are fluidically coupled, via respective tubes 502, 504 to secondary capsule 506. Secondary capsule 506 provides first and second secondary isolators 508, 510, respectively. Secondary isolators diaphragms 508 and 510 separate first and second fluid volumes 334, 336 respectively, from third fluid volume 512. Third fluid volume 512 is coupled, via tube 514, to chamber 516 within differential pressure sensor capsule 518. Third fluid volume 512 surrounds differential pressure sensor 336. The various fill tubes for the first, second, and third fluid volumes are illustrated at 520, 522, and 524, respectively. The fill tubes 520, 522, and 524 are used to fill the respective fluid volumes and then the fill tubes are crimped or otherwise sealed to maintain the fluid volumes therein. As shown in FIG. 5, an independent line pressure sensor 526, shown in phantom, can be coupled to tube 514 to provide a direct indication of the fluid pressure within third volume 512. Basic operation of differential pressure measurement system 500 is similar to that of system 400 (shown in FIG. 4) in that secondary isolator diaphragms 508, 510 engage to isolator stops to address situations where one of pressure inlet 310, 312 is at a high pressure, and the other is vented. Additionally, while not explicitly shown in FIG. 5, secondary capsule 506 may also include one or more thermal compensation bodies, such as that illustrated above with respect to FIG. 3.

Figure 6:
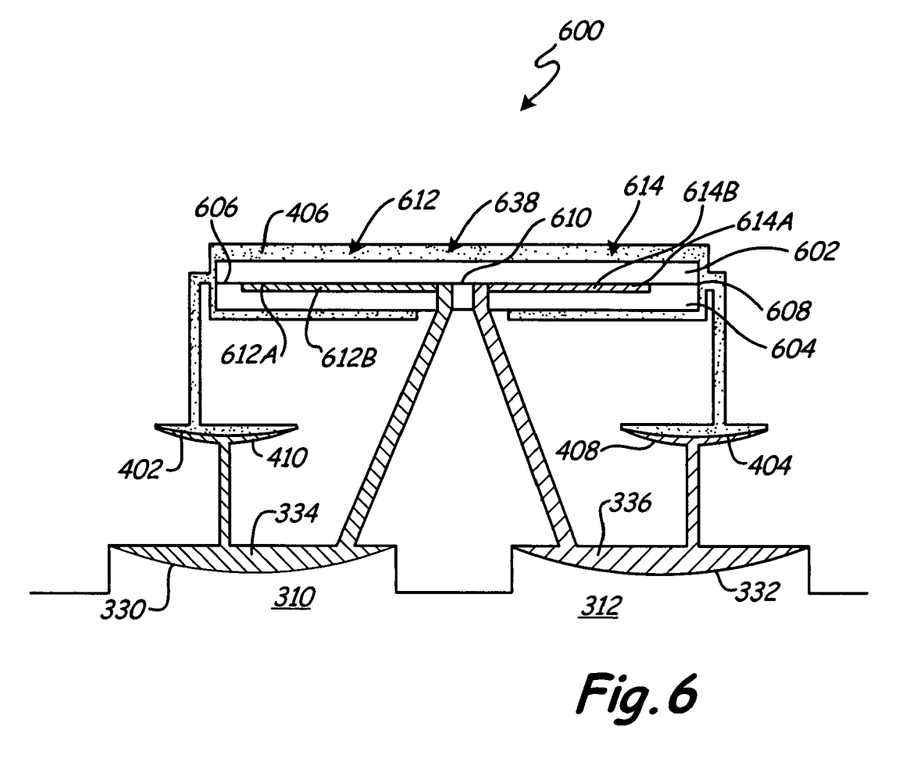
FIG. 6 is a cross sectional view of a portion of a differential pressure transmitter in accordance with another embodiment of the present invention.

FIG. 6 is a cross sectional view of portion of a differential pressure transmitter in accordance with another embodiment of the present invention. Transmitter 600 bears some similarities to transmitter 400 (shown in FIG. 4) and like components are numbered similarly. The primary manner in which transmitter 600 differs from transmitter 400 is in the configuration of differential pressure sensor 638 compared to differential pressure sensor 338 (shown in FIG. 4). Specifically, differential pressure sensor 638 is formed solely from first and second layers 602 and 604, respectively. Layers 602 and 604 are bonded together at edges 606, 608, and at region 610. By fixing first layer 602 to second layer 604 at region 610, a pair of substantially independent pressure sensor regions 612, 614 are created. Each region 612, 614 is fluidically coupled to a respective inlet port 310, 312 via respective first and second isolation fluid volumes 334, 336. Suitable conductive circuitry (not shown in FIG. 6) disposed within regions 612, 614 on surfaces 612A, 612B, 614A, and 614B has an electrical characteristic that varies based upon the amount of deflection of first layer 602 and second layer 604 from one another in sensor regions 612, 614. Alternatively, such circuitry could be mounted to the outside surface of either or both of first and second layers 602, 604. Suitable electrical circuitry can include piezoresistive elements, capacitive plates, or any other suitable circuits, as well as combinations of such circuits. Using piezoresistive circuitry, each diaphragm region 612, 614 can have a full Wheatstone bridge, and outputs can be individually characterized to be subtracted from each other for the differential pressure. Alternately, the straight measurement from one diaphragm can be used when it has a positive output. The positive output from the first sensor can be considered a positive differential pressure and a positive output from the second sensor is then a negative differential pressure. This provides an important advantage in that circuits providing only positive outputs are used. Further, better sensitivity up to a factor of approximately double is provided for the system. Alternately, one Wheatstone bridge can be distributed to both diaphragm regions 612, 614 to supply one output. This is then only characterizing for one output for the differential pressure measurement.

Similarly, capacitance technology can provide important flexibility. Each diaphragm region 612, 614 can supply a capacitance value, which can be characterized individually to the pressure, and the differential pressure then becomes the difference of the readings. Alternately, the capacitances can be made, electrically, to be a ratio output that is characterized, or otherwise related to the differential pressure.

Figure 7:
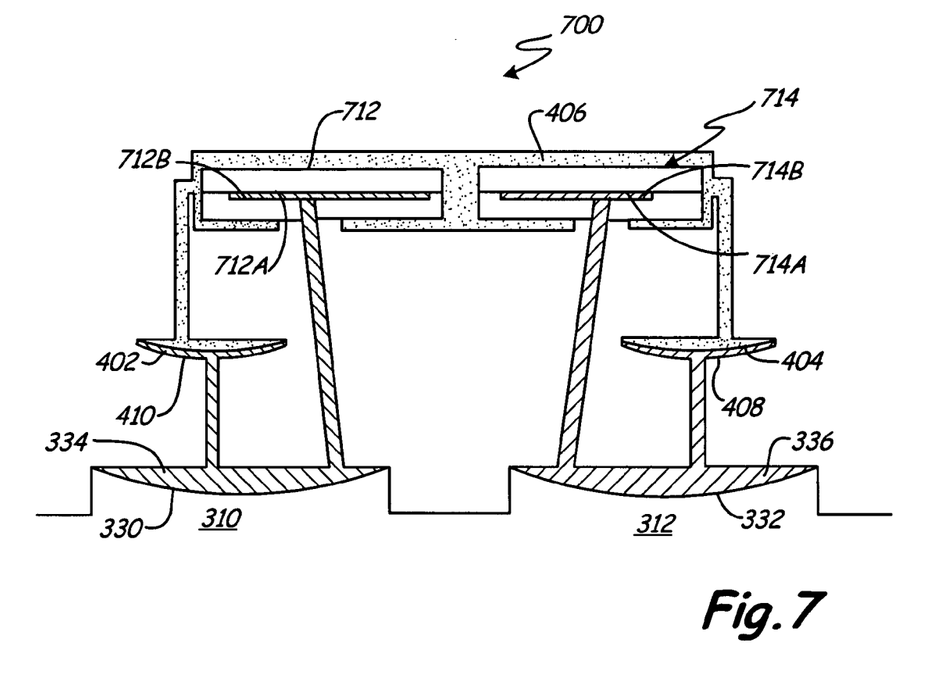
FIG. 7 is a cross sectional view of a portion of a differential pressure transmitter in accordance with another embodiment of the present invention.

FIG. 7 is a cross sectional view of a portion of a differential pressure transmitter in accordance with another embodiment of the present invention. Differential pressure transmitter 700 bears some similarities to differential pressure transmitter 600, and like components are numbered similarly. Differential pressure transmitter 700 differs from transmitter 600 in that differential pressure transmitter 700 provides a plurality of pressure measurement sensors, 712, 714 physically separated from one another while differential pressure transmitter 600 provides sensor portions 612 and 614 coupled together as a single differential pressure sensor 638. However, the various electrical circuits and characteristics of surfaces 712A, 712B, 714A, and 714B can be the same as those described previously with respect to surfaces 612A, 612B, 614A, and 614B. Alternatively, such circuitry could be mounted to the outer surfaces of the sensor(s).

Embodiments of the present invention generally maintain a differential pressure sensor or sensor portions in a compressive state either using a pre-compressed isolation fluid, or line pressure of the process fluid itself. Maintaining the differential pressure sensor in the compressed state allows for more robust operation, and will potentially extend the operating lifetime of such sensors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A differential pressure transmitter comprising:
   first and second process fluid inlets;
   a differential pressure sensor having first and second sensor inlets;
   a first isolator diaphragm disposed proximate the first process fluid inlet and operably coupled to the first sensor inlet through a first fill fluid volume;
   a second isolator diaphragm disposed proximate the second process fluid inlet and operably coupled to the second sensor inlet through a second fill fluid volume;
   transmitter circuitry operably coupled to the differential pressure sensor and configured to measure an electrical parameter of the sensor and provide an indication thereof;
   a third fluid volume substantially surrounding the differential pressure sensor, the third fluid volume exerting a compressive force on the differential pressure sensor; and
   first and second secondary isolator diaphragms, wherein the first secondary isolator diaphragm is operably coupled to the first isolator diaphragm and separates the first fill fluid volume from the third fluid volume, and wherein the second secondary isolator diaphragm is operably coupled to the second isolator diaphragm and separates the second fill fluid volume from the third fluid volume.

2. The transmitter of claim 1, wherein the differential pressure sensor is a brittle material based pressure sensor.

3. The transmitter of claim 1, wherein the first and second fill fluids are incompressible fluids.

4. The transmitter of claim 1, wherein the third fluid is an incompressible fluid.

5. The transmitter of claim 1, wherein the first and second secondary isolator diaphragms are disposed within a capsule.

6. The transmitter of claim 1, and further comprising a line pressure sensor operably coupled to the third fluid volume and electrically coupled to the transmitter circuitry.

7. The transmitter of claim 1, wherein the transmitter is wholly powered by a process communication loop.

8. A differential pressure transmitter comprising:
first and second process fluid inlets;
a differential pressure sensor having first and second sensor inlets, in which the differential pressure sensor is a MEMS device;
a first isolator diaphragm disposed proximate the first process fluid inlet and operably coupled to the first sensor inlet through a first fill fluid volume;
a second isolator diaphragm disposed proximate the second process fluid inlet and operably coupled to the second sensor inlet through a second fill fluid volume;
transmitter circuitry operably coupled to the differential pressure sensor and configured to measure an electrical parameter of the sensor and provide an indication thereof;
a third fluid volume substantially surrounding the differential pressure sensor, the third fluid volume exerting a compressive force on the differential pressure sensor.

9. The differential pressure transmitter comprising:
first and second process fluid inlets;
a differential pressure sensor having first and second sensor inlets;
a first isolator diaphragm disposed proximate the first process fluid inlet and operably coupled to the first sensor inlet through a first fill fluid volume;
a second isolator diaphragm disposed proximate the second process fluid inlet and operably coupled to the second sensor inlet through a second fill fluid volume;
transmitter circuitry operably coupled to the differential pressure sensor and configured to measure an electrical parameter of the sensor and provide an indication thereof;
a third fluid volume substantially surrounding the differential pressure sensor, the third fluid volume exerting a compressive force on the differential pressure sensor; and
a compensation body disposed within the third fluid volume, wherein the compensation body is constructed from a material having a coefficient of thermal expansion that offsets thermal effects of at least one fluid volume.

10. A differential pressure transmitter comprising:
A first pressure sensor having a first sensor inlet;
a second pressure sensor having a second sensor inlet;
first and second process fluid inlets;
a first isolator diaphragm disposed proximate the first process fluid inlet and operably coupled to the first sensor inlet through a first fill fluid volume;
a second isolator diaphragm disposed proximate the second process fluid inlet and operably coupled to the second sensor inlet through a second fill fluid volume;
transmitter circuitry operably coupled to the first and second pressure sensors and configured to measure an electrical parameter of the sensors and provide an indication of differential pressure;
a third fluid volume substantially surrounding the first and second pressure sensors, the third fluid volume exerting a compressive force on the first and second pressure sensors; and
first and second secondary isolator diaphragms, wherein the first secondary isolator diaphragm is operably coupled to the first isolator diaphragm and separates the first fill fluid volume from the third fluid volume, and wherein the second secondary isolator diaphragm is operably coupled to the second isolator diaphragm and separates the second fill fluid volume from the third fluid volume.

* * * * *